United States Patent [19]

Jakeway et al.

[11] Patent Number: 5,764,014
[45] Date of Patent: Jun. 9, 1998

[54] AUTOMATED GUIDED VEHICLE HAVING GROUND TRACK SENSOR

[75] Inventors: Jerome J. Jakeway, Belding; Joseph G. Mickley, Kentwood; David W. Zeitler, Byron Center; James A. Medley, Sparta, all of Mich.

[73] Assignee: Mannesmann Dematic Rapistan Corp., Grand Rapids, Mich.

[21] Appl. No.: 595,353

[22] Filed: Feb. 1, 1996

[51] Int. Cl.$^6$ ........................................ G05D 1/02
[52] U.S. Cl. .................. 318/587; 318/652; 318/618; 364/424.027
[58] Field of Search ........................ 318/580, 587, 318/602, 605, 618, 648, 652, 653, 456, 457, 461, 463, 464; 180/6.2, 252; 280/1, 727; 364/423.098, 424.026, 424.027, 449.1

[56] References Cited

U.S. PATENT DOCUMENTS

| | | |
|---|---|---|
| 3,845,289 | 10/1974 | French . |
| 3,925,641 | 12/1975 | Kashio . |
| 4,084,241 | 4/1978 | Tsumura . |
| 4,139,889 | 2/1979 | Ingels . |
| 4,284,160 | 8/1981 | DeLiban et al. . |
| 4,309,758 | 1/1982 | Halsall et al. . |
| 4,347,730 | 9/1982 | Fisher et al. . |
| 4,465,155 | 8/1984 | Collins . |
| 4,515,221 | 5/1985 | van der Lely . |
| 4,530,056 | 7/1985 | MacKinnon et al. . |
| 4,556,940 | 12/1985 | Katoo et al. . |
| 4,628,453 | 12/1986 | Kamejima et al. . |
| 4,698,775 | 10/1987 | Koch et al. . |
| 4,723,444 | 2/1988 | Hajek . |
| 4,727,492 | 2/1988 | Reeve et al. . |
| 4,758,959 | 7/1988 | Thoone et al. . |

(List continued on next page.)

FOREIGN PATENT DOCUMENTS

| | | |
|---|---|---|
| 0159680A2 | 10/1985 | European Pat. Off. . |
| 0193985A1 | 9/1986 | European Pat. Off. . |
| 0273976A1 | 7/1988 | European Pat. Off. . |
| 0486354A1 | 5/1992 | European Pat. Off. . |
| 0602013A2 | 6/1994 | European Pat. Off. . |
| 3003287A1 | 8/1980 | Germany . |
| 2042217 | 9/1980 | United Kingdom . |
| WO9531759 | 11/1995 | WIPO . |

*Primary Examiner*—Bentsu Ro
*Attorney, Agent, or Firm*—Van Dyke, Gardner, Linn & Burkhart, LLP

[57] ABSTRACT

An automated guided vehicle includes a body, at least one driver wheel for propelling the body along a surface, at least one steered wheel for directing the body with respect to the surface and a body-based inertial navigation system. The inertial navigation system senses actual movement of the body in at least three degrees of freedom. Such sensing is accomplished notwithstanding the presence of side slippage of the vehicle. This can be embodied in an automated guided vehicle having a ground track sensor which continuously senses relative movement of the vehicle with respect to the surface being traversed in order to determine an actual velocity vector of the vehicle. The ground track sensor may physically contact the surface in order to sense the relative movement or may be a non-contact sensor. The disclosed navigation system is especially useful with tugger automated guided vehicles.

33 Claims, 8 Drawing Sheets

U.S. PATENT DOCUMENTS

| | | |
|---|---|---|
| 4,779,203 | 10/1988 | McClure et al. . |
| 4,800,977 | 1/1989 | Boegli et al. . |
| 4,816,998 | 3/1989 | Ahlbom . |
| 4,817,000 | 3/1989 | Eberhardt . |
| 4,820,961 | 4/1989 | McMullin . |
| 4,829,442 | 5/1989 | Kadonoff et al. . |
| 4,846,297 | 7/1989 | Field et al. . |
| 4,847,769 | 7/1989 | Reeve . |
| 4,847,774 | 7/1989 | Tomikawa et al. . |
| 4,882,694 | 11/1989 | Brubaker et al. . |
| 4,887,013 | 12/1989 | Doth . |
| 4,908,557 | 3/1990 | Sudare et al. . |
| 4,940,925 | 7/1990 | Wand et al. . |
| 4,986,378 | 1/1991 | Kasper . |
| 5,029,088 | 7/1991 | Minami . |
| 5,058,023 | 10/1991 | Kozikaro . |
| 5,075,693 | 12/1991 | McMillan et al. . |
| 5,111,401 | 5/1992 | Everett, Jr. et al. . |
| 5,163,001 | 11/1992 | Luke, Jr. . |
| 5,175,415 | 12/1992 | Guest . |
| 5,187,664 | 2/1993 | Yardley et al. . |
| 5,191,528 | 3/1993 | Yardley et al. . |
| 5,204,814 | 4/1993 | Noonan et al. . |
| 5,216,605 | 6/1993 | Yardley et al. . |
| 5,218,542 | 6/1993 | Endo et al. . |
| 5,219,036 | 6/1993 | Schwager et al. . |
| 5,243,524 | 9/1993 | Ishida et al. . |
| 5,255,195 | 10/1993 | Mochizuki et al. . |
| 5,281,901 | 1/1994 | Yardley et al. . |
| 5,334,986 | 8/1994 | Fernhout . |
| 5,341,130 | 8/1994 | Yardley et al. . |
| 5,467,084 | 11/1995 | Alofs et al. . |

AUTOMATED GUIDED VEHICLE HAVING GROUND TRACK SENSOR

BACKGROUND OF THE INVENTION

This invention relates to automated guided vehicles and, in particular, to a navigation and control system for guiding an automatic guided vehicle (AGV) along a system guide path. The invention is particularly adapted for use with dead-reckoning navigation systems, but may also be utilized with systems in which the AGV follows a guide wire that is planted in the floor along the guide path. The invention finds application in material handing, such as movement of material within a factory, as well as on-road and off-road vehicles.

Automated guided vehicles have become extremely effective at movement of materials between processes in a manufacturing plant. Each of a plurality of AGVs automatically carries loads from a pickup point to a discharge point along a system guide path under the supervision of a system controller. The AGVs move along the system guide path, including choosing between branches at each branch point, while avoiding collisions with other AGVs utilizing various control techniques. Navigation of the AGV is typically either by reference to fixed guides, such as guide wires positioned in the floor along the guide path, or by dead-reckoning. Dead-reckoning systems utilize sensors within the AGV in order to monitor the heading, rate-of-change of heading, and distance travelled by the AGV along its longitudinal axis, which is controlled to coincide with the guide path. The dead-reckoning systems are advantageous because they avoid the enormous expense of placing guide wires in the floor along the entire guide path. Additionally, such dead-reckoning systems are flexible because the guide path layout may be altered by programming changes in the controls rather than requiring tearing up and repositioning of the guide wires.

Dead-reckoning systems rely upon an integration of the rate of turn of the vehicle and the distance travelled to maintain position information of the vehicle. Because such measurements tend to drift with time, it is known to supplement the dead-reckoning navigation system with a location verification system, such as markers positioned at precise locations along the system guide path. These sensors are sensed by the AGV as the AGV moves along the guide path in order to verify, and compensate if necessary, the position of the AGV.

One of the attributes of an AGV is its ability to carry enormous loads without an operator for each vehicle. In some applications, the entire load is borne by the AGV itself. In other applications, the AGV pulls, or tugs, one or more trailers which carry the load. As a loaded vehicle moves along the guide path, especially around corners, there is a tendency for the vehicle to be forced off of the guide path by the inertia of the load. Additionally, the load asserts a draft effect on the vehicle. These effects are especially troublesome, although not exclusively limited, to tugger AGVs pulling one or more trailers. This problem becomes especially acute when the AGV traverses a floor which is uneven and has a constantly changing floor surface, such as one that has portions which vary from concrete to oily wood to steel plates, over wide expansion joints, and the like. The problem is further aggravated when the floor is covered with friction-reducing films, such as processing oils, soapy water, and the like. The slippage of an AGV may not be sensed by the vehicle primary navigation system. If the primary navigation system is a dead-reckoning system, the slippage of the vehicle may not be adequately sensed in the rate of turn sensing mechanism. Because the location verification markers are infrequently spaced along the guide path and because of the abrupt alteration of the vehicle position resulting from such slippage, the location verification system may be unable to adequately compensate for the vehicle slippage. If the primary navigation system is based upon sensing a guide wire in the floor, the presence of a pool of liquid, which may give rise to the slippage, may also interfere with adequate sensing of the guide wire.

SUMMARY OF THE INVENTION

The present invention provides an adjunct to the primary navigation system of an AGV by providing an input to the navigation and control computer of the AGV in order to more accurately determine the actual path of movement of the AGV. Such adjunct responds to slippage of the vehicle and, thereby, corrects for errors induced by such slippage and undetected by the primary navigation system. This is accomplished, according to the invention, by providing a ground track sensor which senses relative movement of the AGV with respect to the floor surface being traversed. The invention is based upon a recognition that the primary source of slippage is side-slippage of the vehicle which is not adequately detected by primary navigation systems, especially of the dead-reckoning type.

According to an aspect of the invention, an automatic guided vehicle navigation and control system includes a primary navigation system which senses a heading, or rate-of-change of heading, of an automatic guided vehicle, a ground track sensor, which senses relative movement of the automatic vehicle with respect to a surface being traversed by the vehicle, and a navigation and control computer. The navigation and control computer is responsive to the primary navigation sensing system and to the ground track sensor for determining an actual path of movement of the automatic guided vehicle. The navigation and control computer also compares the actual path of movement with an intended path of movement in order to control movement of the vehicle.

According to another aspect of the invention, a ground track sensor is provided which physically contacts the surface being traversed by the vehicle in order to sense relative movement between the AGV and the surface. The ground track sensor may include an unloaded wheel which does not bear any weight of the vehicle. The wheel preferably is a passive wheel which does not primarily steer or propel the automatic guided vehicle. Such ground-sensing wheel is rotatably mounted to the vehicle to rotate about a vertical axis and includes two precision encoders which monitor the angle of the wheel with respect to the vehicle's direction. Preferably, the wheel is mounted to the AGV with an arm that is pivoted with respect to the swiveling yoke. This allows a downward bias force to be applied to the mounting arms in order to provide firm engagement between the wheel and the floor irrespective of the irregularities in the floor.

The ground track sensor monitors movement of the AGV with respect to the floor and is capable of accurately measuring slippage laterally from the guide path from the angle and distance tavelled. This information is utilized by the navigation and control computer in order to augment the navigation information provided by the primary navigation system. According to another aspect of the invention, the primary navigation and control system includes a steered wheel odometry system which measures the angle and distance travelled by one or more steered wheels. The navigation and control computer blends the outputs from the ground reference sensor and the steered wheel odometry system in order to compensate for any momentary interruptions in the operation of the ground-tracking sensor, such as may be experienced by a wheel encountering debris on the floor or the like. Additionally, the steered wheel odometry system may take the place of the ground track sensor when the vehicle is travelling in the reverse direction. The ground track sensor may be positioned anywhere on the underside of the vehicle or on an outrigger. A greater distance from the primary center of rotation of the vehicle provides greater resolution. However, sensor placement is possible even at the center of rotation of the vehicle, if sufficient sensor resolution is provided.

These and other objects, advantages, and features of this invention will become apparent upon review of the following specification in conjunction with the drawings.

DESCRIPTION OF THE PREFERRED EMBODIMENT

A glossary of terms as used in this application are as follows:

Dead reckoning navigation—Navigation based upon sensing direction and distance travelled by the AGV. Examples include: (a) heading reference sensing, which measures rate of turn of the vehicle, and distance travelled, or (b) differential odometry, which measures differential rotation of spaced coaxial distance measuring encoders, and distance travelled, or (c) steered wheel odometry, which measures angle and distance travelled by one or more steered wheels; or a combination of these.

Heading reference sensor—An inertial sensor which provides a navigational computer with a measurement of an AGV's rate of turn.

primary navigation—Navigation utilizing (a) dead reckoning navigation or (b) sensing of a guide wire implanted in the floor along a desired path; or a combination of these.

Navigation computer—A computer-based system which continuously calculates the current position of the AGV based upon inputs from various guidance sensors.

System guide path—A virtual path laid out with respect to a floor. This is the intended path of travel of the AGVs and can have various branching.

Steering system—One or more load-bearing, swivel wheel assemblies rotated by a steer motor. The motor is servo driven by a steer/monitor circuit in response to commands received from a navigation computer. A steering angle encoder provides feedback to the navigation computer of responses to steer commands.

Location verification system—Markers positioned at precise locations along the system guide path which are sensed by the AGV in order to verify, and compensate if necessary, the position of the AGV. This can include permanent magnets, plaques, transponders, code carriers, and the like.

Ground track sensor—A system that continuously senses actual movement of the AGV with respect to the floor being traversed. Measures lateral travel, longitudinal travel, and/or rotation of the vehicle.

Figure 1:
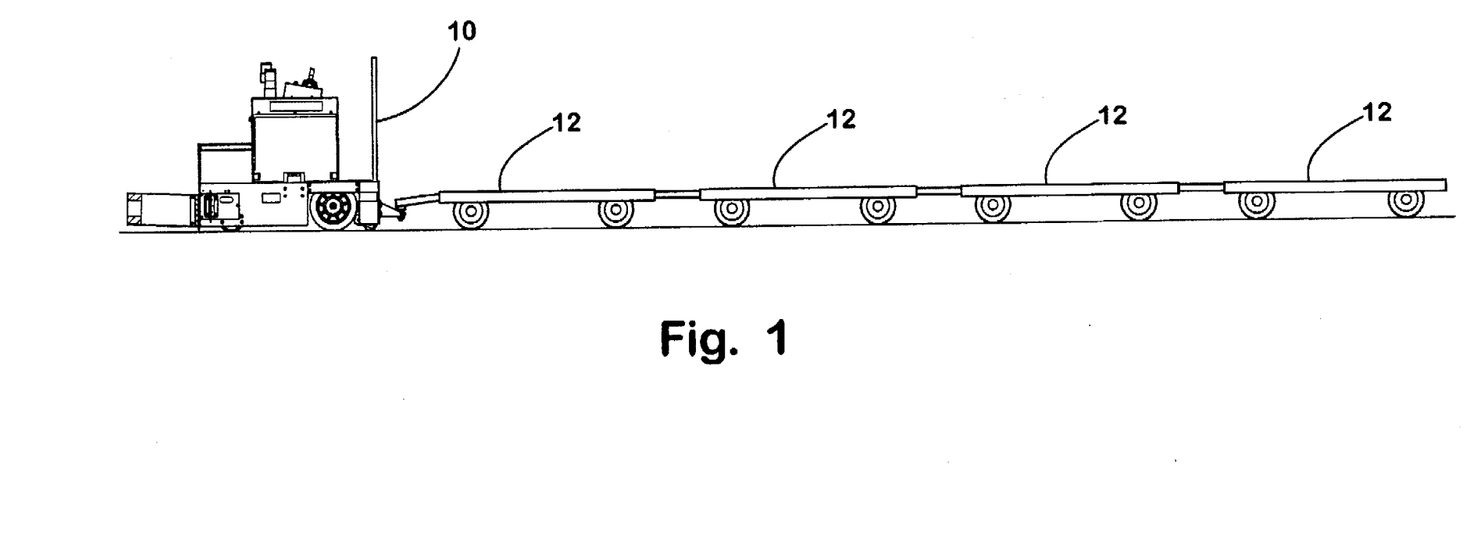
FIG. 1 is a side elevation of an automated guided vehicle (AGV) according to the invention towing a plurality of trailers.

Referring now specifically to the drawings and the illustrative embodiments depicted therein, an automated guided vehicle (AGV) 10 is illustrated pulling a plurality of trailers 12 (FIG. 1). Each trailer 12 is typically loaded with materials, such as raw materials or finished components. Although the invention is illustrated with respect to such tugger AGV, its principles are applicable to AGVs in which the load is carried by the AGV per se.

AGV 12 includes a body 14 whose weight is supported by one or more rear drive wheels 16 and one or more forward steering wheels 18 (FIGS. 2–6). In the illustrated embodiment, two drive wheels 16 and one forward steering wheel 18 are utilized, although the invention is applicable to other combinations of driven and steered wheels. AGV 10 includes a local operator console 20 in order for the the vehicle to be manually operated and to be initiated into the AGV system. However, the AGV is typically under the control of a central control 21 which provides instruction to the AGV regarding its specified destination as well as the position and destination of other AGVs so that each AGV is capable of avoiding collisions with other AGVs. AGV 10 additionally includes a forward bumper 22 in order to sense impact with an object in the AGV's guide path and a hitch 24 in order to pull trailers 12.

Figure 2:
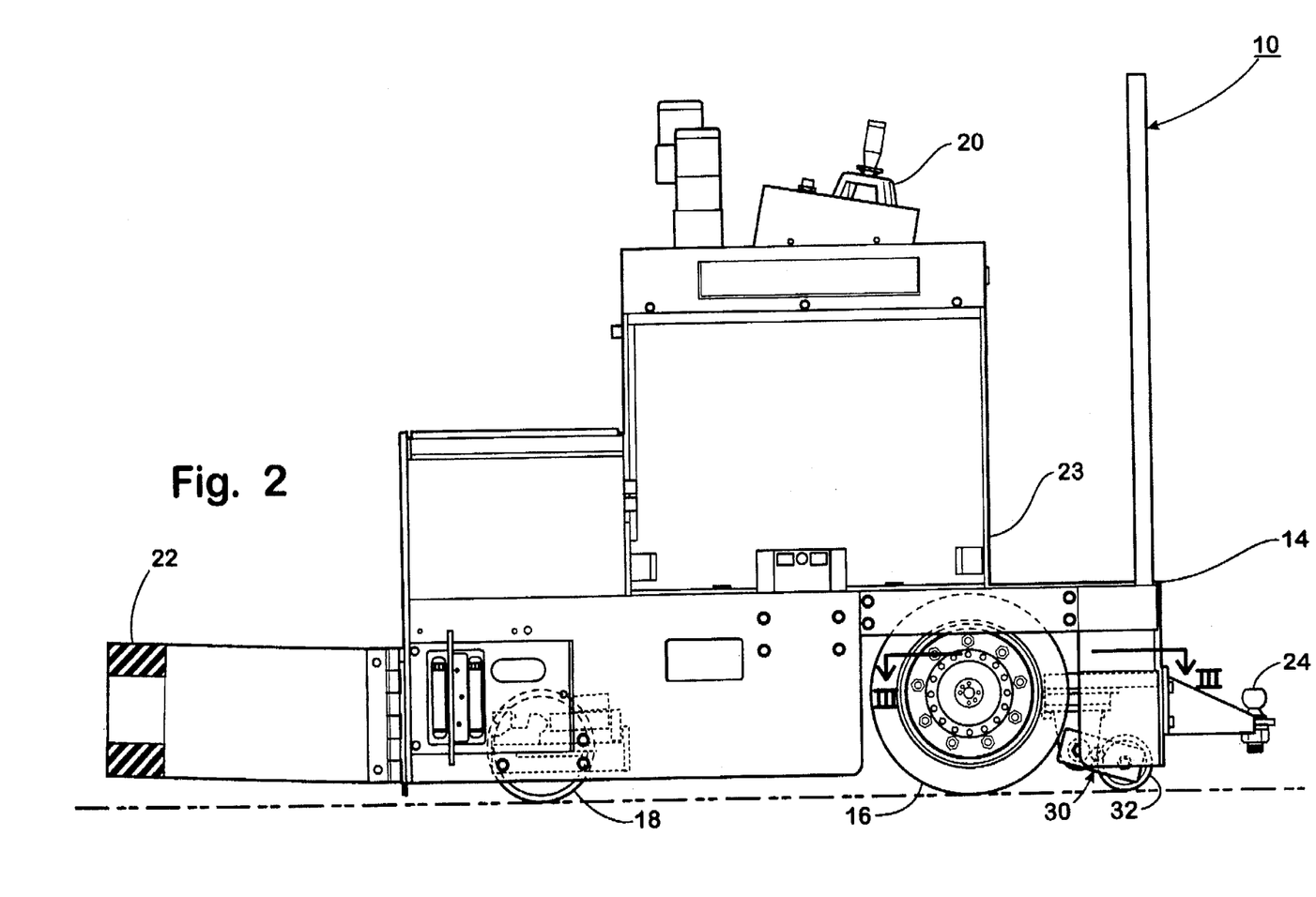
FIG. 2 is a side elevation of the AGV in FIG. 1.
Figures 3, 5:
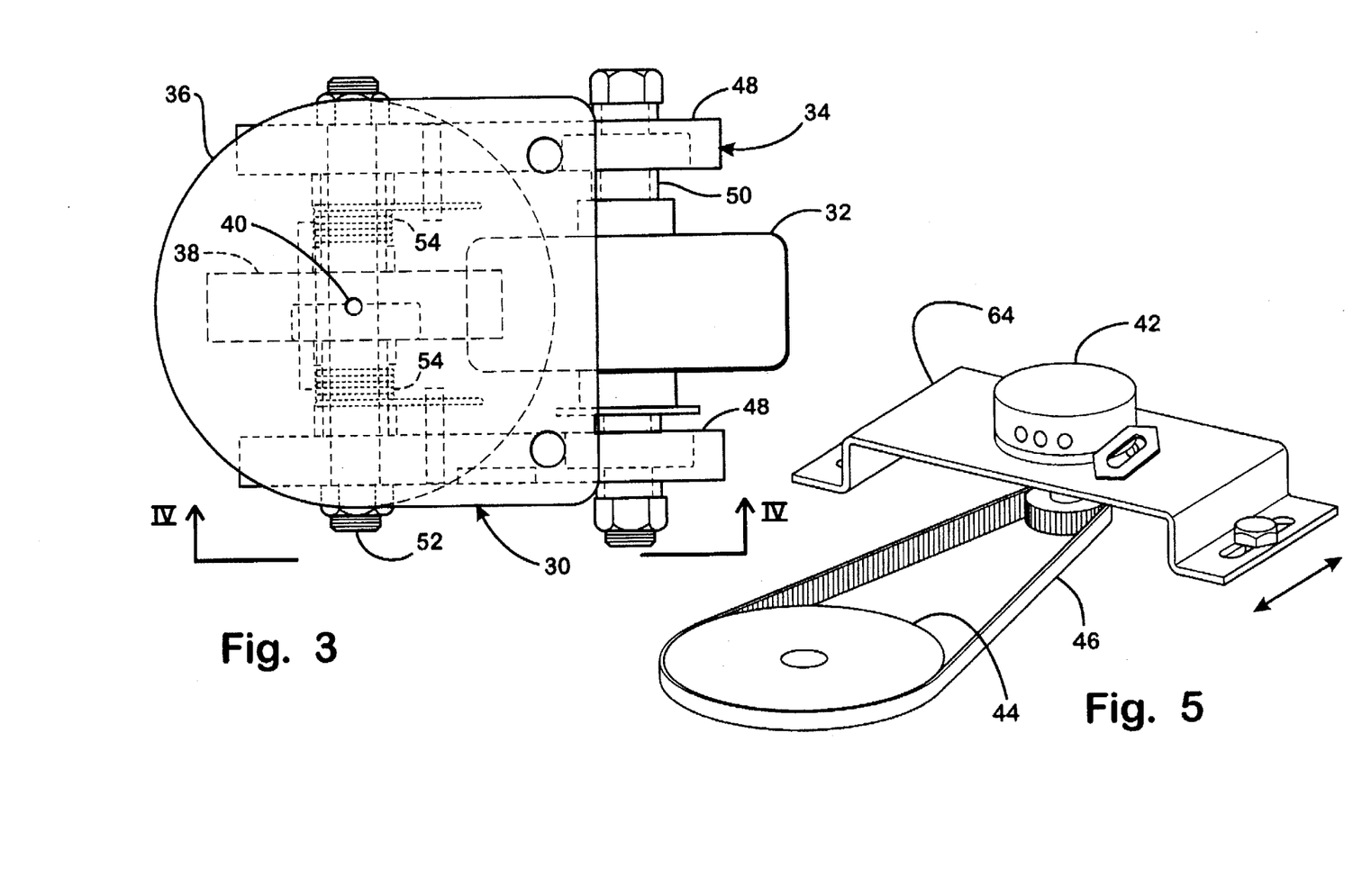
FIG. 3 is a sectional view taken along the lines III—III in FIG. 2.
FIG. 5 is a perspective view of an angle encoder useful with the invention.
Figure 4:
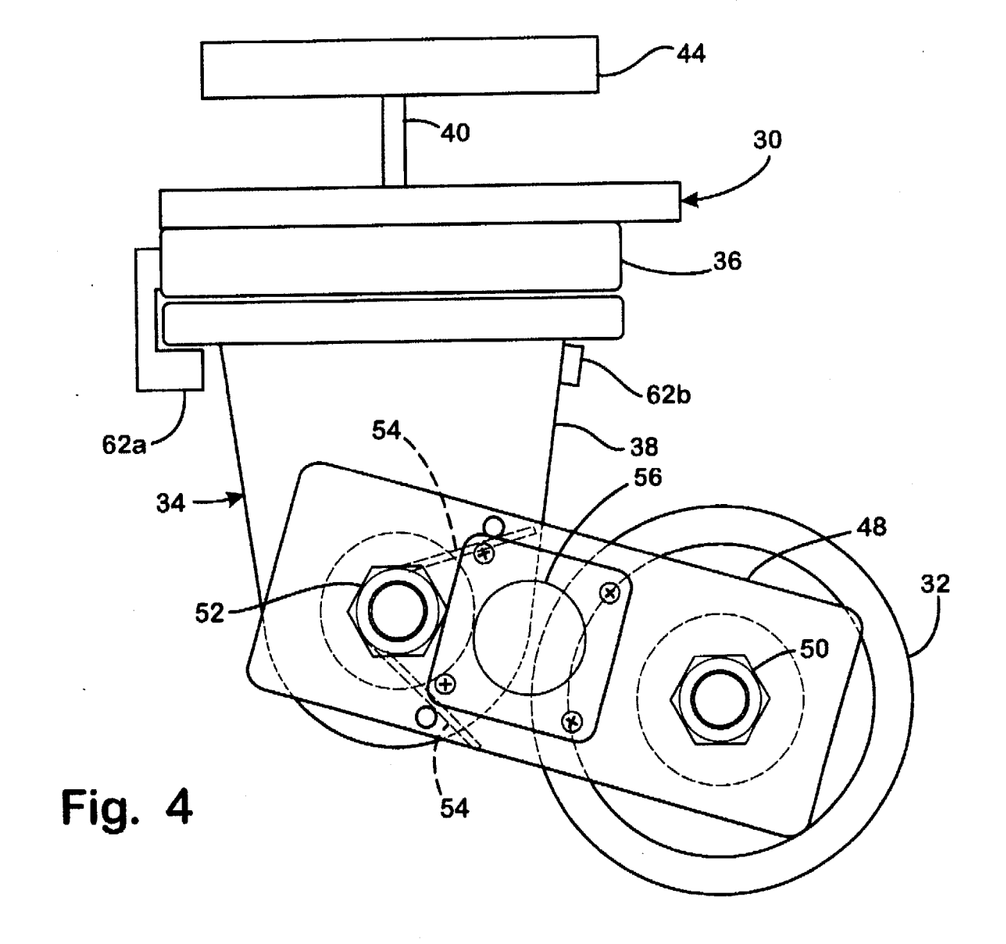
FIG. 4 is a side elevation taken in the direction indicated at IV—IV in FIG. 3.

Each AGV 10 is powered from a bank of batteries, located in a compartment 23, which supply an electric DC motor 26 associated with each drive wheel 16 through a motor control 27. AGV 10 additionally includes a ground track sensor, generally shown at 30, for continuously sensing movement of vehicle body 14 in the longitudinal direction of the vehicle as it travels along its guide path and rotation of the vehicle, as will be described in more detail below. In the illustrated embodiment, ground track sensor 30 includes a wheel 32 which is a non-load-bearing wheel with respect to vehicle body 14. Ground track sensor 30 additionally includes a support 34 for wheel 32 including a swivel joint 36 which attaches a yoke 38 for rotational movement about a vertical axis extending through a pin 40, which translates the rotational movement of the yoke to a pulley 44. Swivel 36 includes a bearing plate which is a machined ball brace. A pair of support arms 48, which are made of thick steel plate, support an axle 50 for wheel 32. Support arms 48 are pivotally mounted to yoke 38 by a yoke axle 52. Yoke axle 52 allows relative vertical movement of wheel 32 with respect to vehicle body 14. A spring 54 provides a downward bias to wheel 32 in order to maintain the wheel in constant contact with the floor. This is especially useful as the wheel runs over expansion cracks and objects on the floor so that the wheel maintains constant contact with the floor. Wheel 32 is made of a durable urethane material which both minimizes wear and provides adequate friction between the wheel surface and the floor. Additionally, this allows easy replacement of the wheel surface.

A distance-measuring encoder (DME) 56 is mounted to support arms 48 and interconnected with wheel 32 by a chain (not shown). Encoder 56 is connected electrically with a navigation and control computer 58 by a cable 60. A stationary stop 62a and a moveable finger 62b restrict rotation of yoke 38 to less than one revolution in order to protect cable 60. In the illustrated embodiment, encoder 56 provides 50 pulse-per-revolution accuracy in two quadrature channels which allows measurements of movement in both forward and reverse directions of the vehicle. In the illustrated embodiment, the encoder is used in only the forward direction of the vehicle thereby providing 100 pulse-per-revolution accuracy. As an alternative, the internal clock of the navigation and control unit may be utilized to provide interpolated pulses at 100 pulse-per-revolution in both forward and reverse directions. Instead of using an encoder, distance may be measured by other distance measuring devices. Rotational movement of yoke 38 is transferred to a stationary precision encoder 42 by way of pulley 44 and a belt 46. Belt 46 is a cog-type timing belt in order to avoid misalignment between the pulley 44 and encoder 42. Encoder 42 is mechanically and electrically zeroed to a center position to within plus or minus 0.5 degrees of center. Encoder 42 is mounted by a bracket 64 which is adjustably mounted in order to allow tensioning of belt 46.

Figure 6:
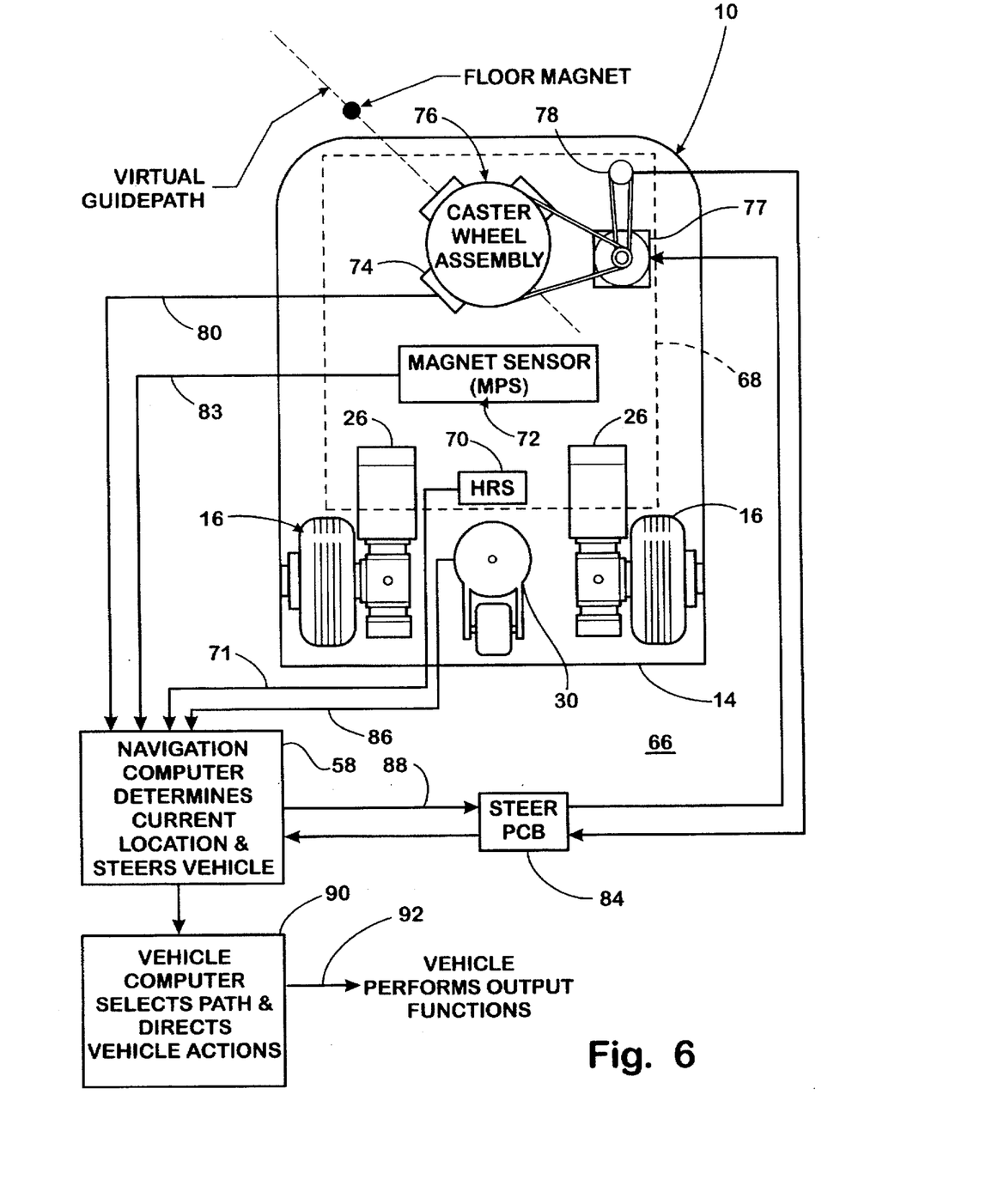
FIG. 6 is a plan view of an AGV illustrating layout and interconnection of major components of its navigation and control system.
Figure 7:
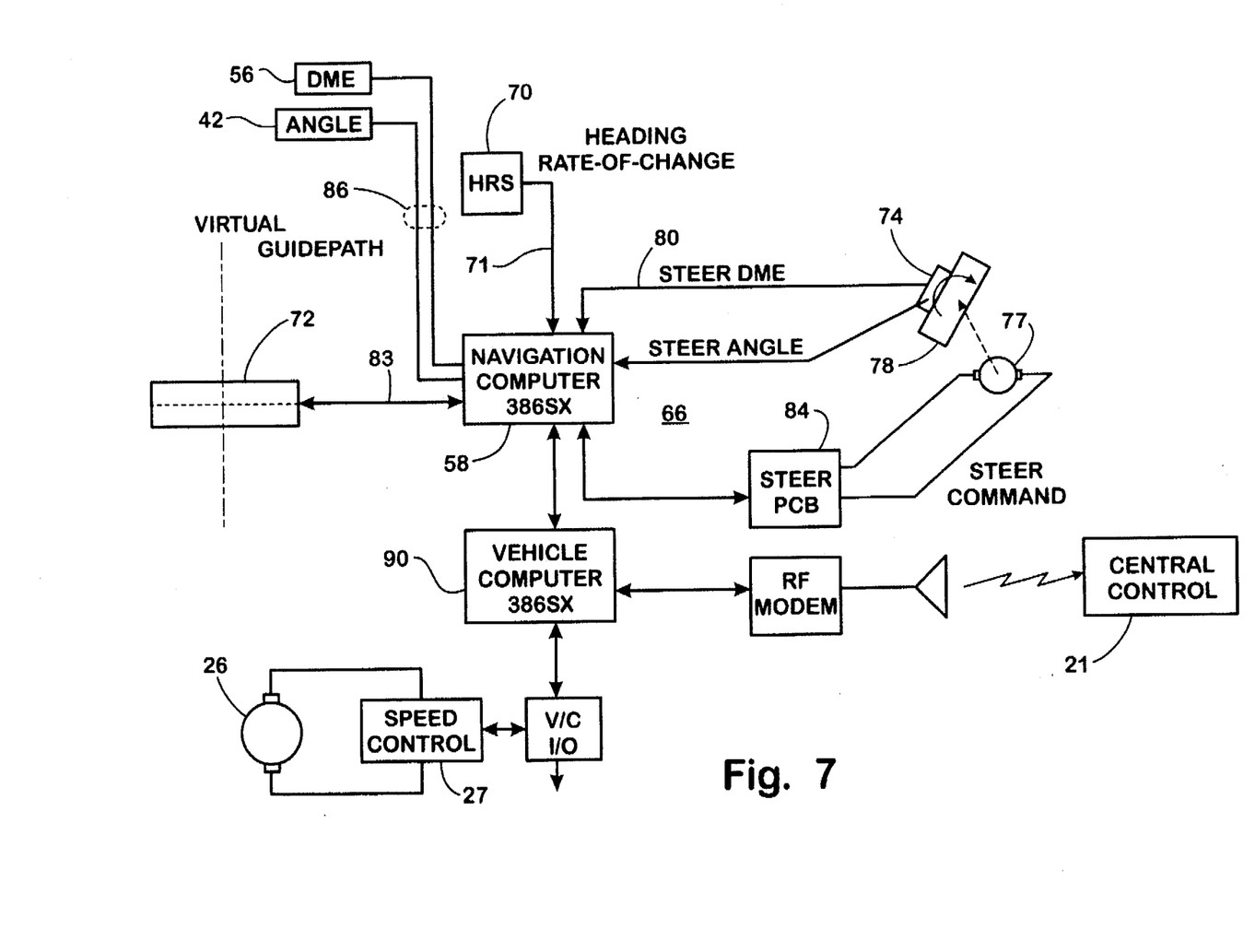
FIG. 7 is a block diagram of the AGV navigation and control system.

AGV 10 includes a vehicle navigation and steering control system 66 (FIGS. 6 and 7). System 66 includes a primary navigation system 68 which is a dead-reckoning sensing system. Primary navigation system 68 utilizes a heading reference sensor (HRS) 70, which is an inertial sensor which provides a measurement of the rate of turn of AGV 10. In the illustrated embodiment, heading reference sensor 70 is a spinning mass gyroscope marketed by Smith Industries Aerospace & Defense Systems, Inc. under Model No. 9190 A. However, other inertial sensors, such as fiber optic sensors, tuning fork sensors, and the like, may be utilized. Other dead-reckoning sensing systems could be used, such as magnetometer sensors, and the like, which sense heading of the vehicle. Primary navigation system 68 additionally includes a magnetic sensor 72 which is a location verification system. Magnetic sensor 72 senses magnetic markers which are positioned at precise locations along the system guide path in order to update the position of the AGV stored in navigation and control computer. The primary navigation system may additionally include a distance-measuring encoder (DME) 74 of a steering wheel assembly 76. Steering wheel assembly 76 additionally includes an angle encoder 78. DME 74 produces an output 80 which is supplied to navigation computer 58 that represents distance travelled by steering wheel 18. Angle encoder 78 produces an output 82 to a steering control 84 indicative of the angle of steering wheel 18 under the control of steering control 84. Ground track sensor 30 produces an output 86 to navigation and control computer 58. The output of ground track sensor 30 identifies ground track distance as well as the degree of the vehicle turn. Alternatively, distance could be measured by integration of measured velocity of the vehicle.

Navigation and control computer 58 processes inputs 71, 80, 83, and 86 and produces an output 88 to steering control 84. This output represents a correction in the heading of the vehicle in order to align the actual position of the vehicle, calculated by navigation and control computer 58, with a desired heading. The desired heading is established by a vehicle computer 90 which receives instructions from central control 21 utilizing a wireless communication channel, such as infrared, RF, or the like. Computer 90 produces an output 92, which, for example, controls the speed of propulsion motors 26. In the illustrated embodiment, motors 26 are operated by motor control 27 between one of three speeds; the lowest speed being a stopped condition.

If slippage of AGV 10 is minimal, navigation can be done, utilizing standard dead-reckoning techniques, with primary navigation system 68 including heading rate sensor 70, distance travelled from DME 74 and turn angle from angle encoder 78. The output of heading rate sensor 70 is integrated in order to determine vehicle heading as follows:

$$\psi = \int \Delta \psi dt \quad (1)$$

where $\psi$ is the heading of the vehicle and $\Delta$ is the rate in change of heading of the vehicle.

The output of DME 74 ($d_s$) and the output of angle encoder 78 ($\theta$), along with an assumption of a fixed rotation point for the vehicle updates the location of the navigation point of the vehicle with respect to the floor. Equations 2 and 3 are incremental distances of the vehicle body 14, at point (0,0) in FIG. 8, which is the assumed vehicle velocity vector. Equations 4 and 5 integrate these components with the current (X, Y) position by rotating the distance travelled from body-based components to floor-based coordinate systems at the same time, as follows:

$$d_{sx} = d_s \cos \theta \quad (2)$$

$$d_{sy} = d_s \sin \theta - \Delta \psi L_3 \quad (3)$$

$$x = x + d_{sx} \cos \psi - d_{sy} \sin \psi \quad (4)$$

$$y = y + d_{sx} \sin \psi + d_{sy} \cos \psi \quad (5)$$

The invention is based upon the recognition that the assumption of minimal slippage is not always true. Although not limited to such applications, such slippage is especially present for tugger vehicles whose dynamics change drastically under loads applied to hitch 24. Varied plant floor conditions, such as wood block, steel and cement floors in the AGV, poor repair of the floor and debris, such as oil, grease, and scrap material, all add to the slippage problem. In particular, the loaded wheels, such as drive wheels 16 and steering wheel 18 are extremely susceptible to slippage. Sensors mounted on these points of the vehicle provide an opportunity for erroneous navigational information. The slippage makes the assumption of a fixed vehicle rotation point invalid. Indeed, there are often cases where the actual rotation occurs about a point outside the vehicle, producing lateral translation rather than rotation.

This problem is cured, according to the present invention, by the addition of ground track sensor 30. Ground track sensor 30 is, in the illustrated embodiment, an unloaded, freely pivoting wheel which measures the distance travelled for the wheel and the angle the wheel has travelled with respect to the vehicle frame. Because wheel 32 does not have steering or load forces, these sources of error in sensor measurement are substantially eliminated. Additionally, its free-pivoting action allows simultaneous measurement of the vehicle rotation, movement along the longitudinal axis, and lateral translation. When this information is combined with outputs of the primary navigational system 68, both movement along the longitudinal axis and lateral translation of the vehicle can be resolved and applied to the floor position of the vehicle.

Figure 8:
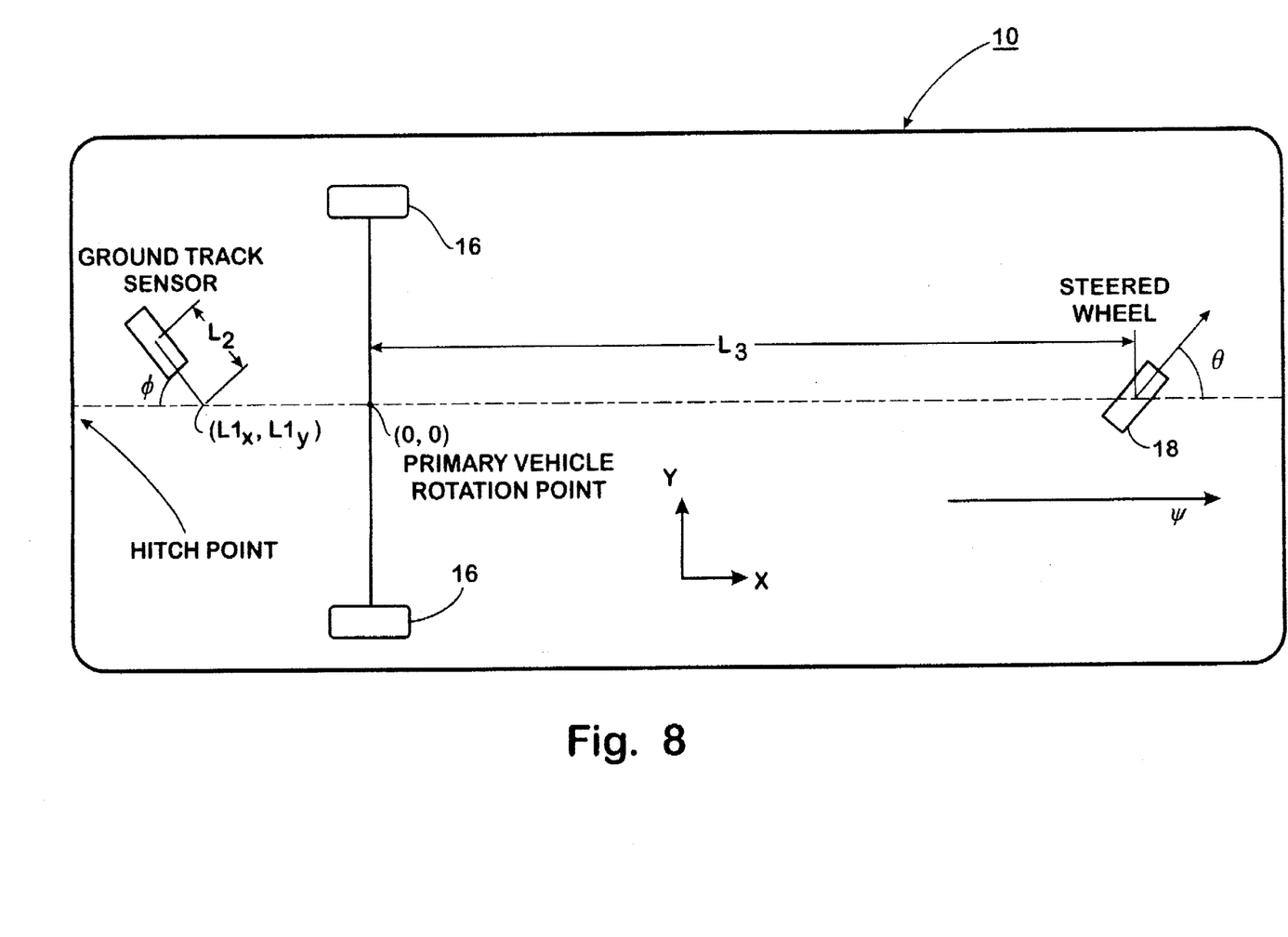
FIG. 8 is a diagram illustrating parameters used in the navigation and control system.

This compensation can be seen by reference to FIG. 8. This distance measured by ground track sensor 30 is transformed into body-based distances at point (0, 0) utilizing the location ($L_{1x}, L_{1y}$) of ground track sensor 30 and the distance $L_2$ of wheel 30 from pivot point 40. The effect of rotation of the vehicle, as measured by heading reference sensor 70, is then removed utilizing equations 6 and 7 as follows:

$$d_x = d_t \cos \phi + \Delta \psi L_{1y} - (\Delta \psi + \Delta \phi) L_2 \sin \phi \quad (6)$$

$$d_y = d_t \sin \phi - \Delta \psi L_{1x} + (\Delta \psi + \Delta \phi) L_2 \cos \phi \quad (7)$$

These distances are then translated to floor coordinates and summed to current plant-based X, Y positions according to equations 8 and 9 in order to arrive at an actual vehicle velocity vector, notwithstanding the presence of steer wheel slippage and/or traction wheel slippage.

$$x = X + d_x \cos \psi - d_y \sin \psi \tag{8}$$

$$y = Y + d_x \sin \psi + d_y \cos \psi \tag{9}$$

It is seen by examination of equations 6–9 that the updating of the floor-based (X, Y) position of AGV 10 is a function of the heading of the vehicle, the angle of the ground track sensor, and the rotation of the ground track sensor. As such, the inputs from distance-measuring encoder 74 and the angle encoder 78 of the steering wheel assembly 76 are redundant. In one embodiment of the invention, the inputs from the steered wheel assembly are not utilized in the guidance and control of the AGV 10. Guidance of AGV 10 is a function of the readings of heading reference sensor 70 and ground track sensor 30 alone. In embodiments of the invention in which AGV 10 only travels in a forward direction, such guidance and control is sufficient. This embodiment allows ground track sensor 30 to be utilized with stops 62a, 62b which simplifies the structure of ground track sensor 30 by allowing use of a cable connection to the DME 56.

However, if AGV 10 is occasionally operated in a reverse direction, then the outputs of distance-measuring encoder 74 and angle encoder 78 of steering wheel assembly 76 are substituted for those of ground track sensor 30 when the vehicle is being driven in the reverse direction. This allows DME 56 to be utilized in a unidirectional rotation to increase resolution, as previously described. Although steering wheel 18 is a loaded and steered wheel, its performance at the rear of the vehicle, when the vehicle is being reversed, is superior to that of ground track sensor 30. In this reversing embodiment, ground track sensor 30 could be supplemented with a slip ring assembly, an inductive pickup, an optical data link, or the like, to pick up DME data while allowing yoke 38 to swivel in a full 360-degree rotation.

In an alternate embodiment of the invention, signals from encoders 42 and 56 of ground track sensor 30 and the distance-measuring encoder 74 and angle encoder 78 of steering wheel assembly 76 are blended together even when vehicle 10 is operated in a forward direction. Such blended solution allows the navigation and steering control system to selectively ignore readings from ground track sensor 30 when such readings are invalid due to debris on the floor being traversed by wheel 32 and the like. The signals received from ground track sensor 30 and steering wheel assembly 76 are combined utilizing a Kalman filter, in a manner which would be readily apparent to those skilled in the art.

In the illustrated embodiment, updates in the position of AGV 10 are calculated at a 100 Hz update rate. The equations 6–9 are calculated with the assistance of a Model 80387 mathematic coprocessor of the type marketed by Intel Corporation or Cyrix Corporation. The present invention has been fully reduced to practice and successfully commercialized in an AGV marketed by Rapistan Demag Corporation, Grand Rapids, Mich., under Models DT-60 and DL-140. Although the invention has been illustrated with respect to a material handling AGV, it has broader application to on-road vehicle navigation, such as those utilized in commercial and personal vehicles, as well as control systems for off-road vehicles, including military vehicles, such as armored vehicles and the like.

Although the invention has been illustrated with a ground-contacting ground track sensor, it may be implemented with non-contact sensors. Suitable non-contact sensors may include ultrasonic sensors, particularly those utilizing differential Doppler-shift sensing, infrared sensors, vision correlation sensors, laser sensors, and the like.

Figure 9:
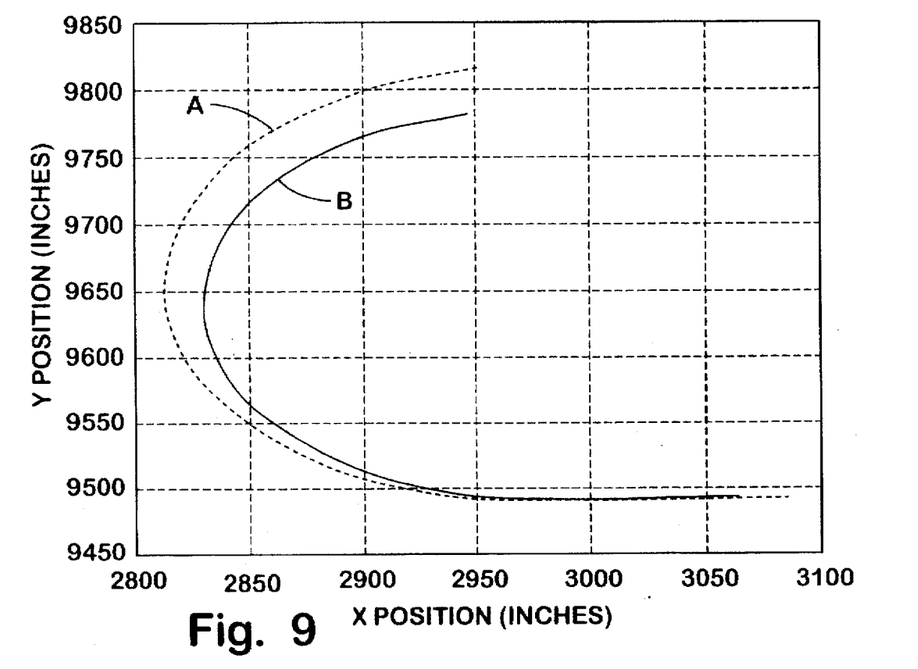
FIG. 9 is a chart illustrating a comparison between vehicle positions as measured by a primary navigation system versus the position as measured by a ground track sensor.
Figure 10:
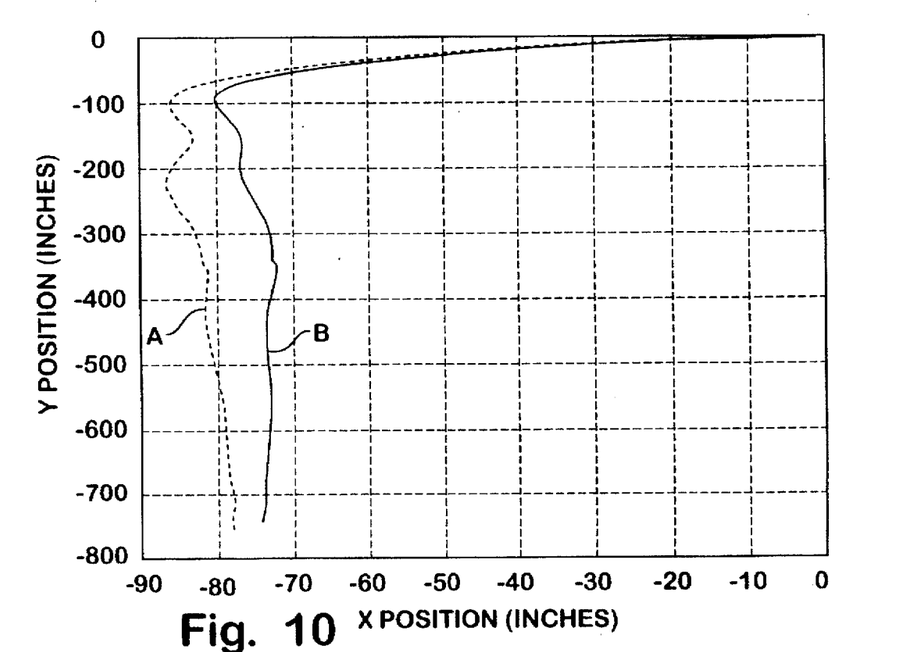
FIG. 10 is another chart illustrating a comparison between vehicle positions as measured by a primary navigation system versus the position as measured by a ground track sensor.

FIGS. 9 and 10 illustrate a comparison between a position indication A derived from a steering wheel encoding system in combination with a dead-reckoning primary navigation system and a position indication B measured by a ground track sensor in combination with the primary navigation system. These graphs illustrate the often significant variation between these two measurements. Experiments indicate that the measurement of the position of the vehicle made by the ground track sensor is much closer to actual vehicle position.

Changes and modifications in the specifically described embodiments can be carried out without departing from the principles of the invention which is intended to be limited only by the scope of the appended claims, as interpreted according to the principles of patent law including the doctrine of equivalents.

The embodiment of the invention in which an exclusive property or privilege is claimed are defined as follows:

1. An automated guided vehicle navigation and steering control system, comprising:

a primary navigation system which senses a heading or a rate-of-change of heading of an automated guided vehicle;

a ground track sensor which continuously senses relative movement of the automated guided vehicle with respect to a surface being traversed by the vehicle in order to determine an actual velocity vector of the vehicle; and a navigation and control computer which is responsive to said primary navigation system and said ground track sensor for determining an actuated path of movement of the automated guided vehicle and for comparing said actual paths of movement with an intended path of movement in order to control movement of the vehicle.

2. The system in claim 1 wherein said ground track sensor physically contacts the surface in order to sense the relative movement.

3. The system in claim 2 wherein said ground track sensor includes a wheel in physical contact with the surface and does not carry substantially any vehicle weight and is a passive wheel which does not steer or propel the automated guided vehicle.

4. The system in claim 3 including a ground-engaging bias for said wheel.

5. The system in claim 4 wherein said ground-engaging bias includes an arm rotatably mounting said wheel, a horizontal pivot for said arm, and a mechanical bias applying a downward force on said arm.

6. The system in claim 3 wherein said ground track sensor includes a yoke that is rotatably mounted to rotate about a vertical axis, an angle encoder which measures the radial position of said yoke with respect to said vertical axis, a wheel assembly attached to said yoke including a wheel mounted to rotate about a horizontal axis and a distance encoder measuring revolution of said wheel about said horizontal axis.

7. The system in claim 6 including at least one stop which restricts rotation of said yoke to rotate less than 360 degrees about said vertical axis.

8. The system in claim 1 further including at least one driven wheel for propelling the automated guided vehicle and at least one steered wheel for directing the automated guided vehicle.

9. The system in claim 8 wherein said at least one steered wheel includes a steered wheel monitoring system which senses steering angle and rotation of said at least one steered wheel.

10. The system in claim 9 wherein said navigation and control computer is responsive to said steered wheel monitoring system for determining an actual path of movement of the automated guided vehicle when the vehicle is moving in a reverse direction.

11. The system in claim 9 wherein said navigation and control computer is also responsive to said steered wheel monitoring system in order to provide a monitoring of the relative movement of the vehicle with respect to a surface being traversed that is blended with the ground track sensor monitoring.

12. The system in claim 1 wherein said primary navigation system is a dead-reckoning system.

13. The system in claim 12 wherein said primary navigation system is one of an inertial navigation system, a differential odometry system, and a steered wheel odometry system.

14. The system in claim 13 wherein said primary navigation system is an inertial navigation system.

15. An automated guided vehicle, comprising:
a body, at least one driver wheel for propelling said body along a surface, and at least one steered wheel for directing said body with respect to the surface;
a primary navigation system which senses a heading or a rate-of-change of heading of the body;
a distance measuring device which measures distanced travelled by said body in a longitudinal direction;
a ground track sensor which is independent of said wheels and which continuously monitors movement of said body with respect to the surface at least in a lateral direction; and
a navigation and control computer which is responsive to said primary navigation system, to said distance measuring device and to said ground track sensor for determining an actual path of movement of said body and for controlling said steering wheel in order to direct said body along an ideal path of movement.

16. The vehicle in claim 15 wherein said ground track sensor physically contacts the surface in order to sense the relative movement.

17. The vehicle in claim 16 wherein said ground track sensor includes a wheel in physical contact with the surface and does not carry substantially any vehicle weight and is a passive wheel which does not steer or propel the automated guided vehicle.

18. The vehicle in claim 17 including a ground-engaging bias for said wheel.

19. The vehicle in claim 17 wherein said ground track sensor includes a yoke that is rotatably mounted to rotate about a vertical axis, an angle encoder which measures the radial position of said yoke with respect to said vertical axis, a wheel assembly attached to said yoke and including a wheel mounted to rotate about a horizontal axis, and a distance encoder measuring revolution of said wheel about said horizontal axis.

20. The vehicle in claim 15 wherein said at least one steered wheel includes a steered wheel monitoring system which senses steering angle and rotation of said at least one steered wheel.

21. The vehicle in claim 20 wherein said navigation and control computer is responsive to said steered wheel monitoring system for determining an actual path of movement of the automated guided vehicle when the vehicle is moving in a reverse direction.

22. The vehicle in claim 20 wherein said navigation and control computer is also responsive to said steered wheel monitoring system in order to provide a monitoring of the relative movement of the vehicle with respect to a surface being traversed that is blended with the ground track sensor monitoring.

23. The vehicle in claim 15 wherein said primary navigation system is one of an inertial navigation system, a differential odometry system, and a steered wheel odometry system.

24. The vehicle in claim 23 wherein said primary navigation system is an inertial navigation system.

25. An automated guided vehicle comprising:
a body, at least one driver wheel for propelling said body along a floor, at least one steered wheel for directing said body with resect to the floor, and a steered wheel monitoring system which monitors steering angle of said at least one steered wheel;
an inertial navigation sensor which senses rate-of-change of heading of said body;
a ground track sensor which monitors a ground velocity vector with respect to said body independent of said wheels; and
a navigation and control computer which is responsive to said inertial navigation sensor and to said steered wheel monitoring system and said ground track sensor for determining an actual path of movement of said body and for controlling said steering wheel in order to direct said body along an ideal path of movement.

26. The vehicle in claim 25 wherein said navigation and control computer determines an actual path of movement of said body in response to said ground track sensor when the vehicle is moving in a forward direction.

27. The vehicle in claim 25 wherein said navigation and control computer determines an actual path of movement of said body as a blend of said ground track sensor and said steered wheel monitoring system.

28. The vehicle in claim 25 wherein said navigation and control computer determines an actual path of movement of said body in response to said steered wheel monitoring system when the vehicle is moving in a reverse direction.

29. An automated guided vehicle comprising:
a body, at least one driver wheel for propelling said body along a floor, and at least one steered wheel for directing said body with respect to the floor; and
a body-based inertial navigation system which senses actual movement of said body in at least three degrees of freedom irrespective of side slippage of the vehicle.

30. The vehicle in claim 29 wherein said at least three degrees of freedom include vehicle longitudinal velocity, vehicle lateral velocity and vehicle heading.

31. The vehicle in claim 30 wherein said inertial navigation system includes a gyroscope and a ground track sensor which continuously monitors movement of said body with respect to the floor.

32. The vehicle in claim 31 wherein said ground track sensor contacts the floor.

33. The vehicle in claim 31 wherein said gyroscope is one of a spinning mass gyroscope, a fiber optic gyroscope and an acoustic gyroscope.

* * * * *

UNITED STATES PATENT AND TRADEMARK OFFICE
CERTIFICATE OF CORRECTION

PATENT NO. : 5,764,014
DATED : June 9, 1998
INVENTOR(S) : Jerome J. Jakeway, Joseph G. Mickley, David W. Zeitler and James A. Medley It is certified that error appears in the above-identified patent and that said Letters Patent is hereby corrected as shown below:

Column 1, line 51:
"comers" should be --corners--.

Column 3, line 57:
"primary" should be --Primary--.

Column 7, line 6, equation (9):
"Y" should be --y--.

Signed and Sealed this

Thirty-first Day of August, 1999

Attest:

Q. TODD DICKINSON

*Attesting Officer*  *Acting Commissioner of Patents and Trademarks*